United States Patent [19]

Nakada et al.

[11] Patent Number: 4,603,415
[45] Date of Patent: Jul. 29, 1986

[54] SYSTEM FOR LINKING CHANNEL GROUP IN DIGITAL COMMUNICATION NETWORK

[75] Inventors: Hiroshi Nakada; Hisao Kawano, both of Yokohama, Japan

[73] Assignee: Fujitsu Limited, Kawasaki, Japan

[21] Appl. No.: 588,939

[22] Filed: Mar. 13, 1984

[30] Foreign Application Priority Data

Mar. 18, 1983 [JP] Japan ................................. 58-45400

[51] Int. Cl.⁴ ........................................... H04Q 11/04
[52] U.S. Cl. ...................................... 370/58; 370/59
[58] Field of Search ................................ 340/58, 59

[56] References Cited

U.S. PATENT DOCUMENTS

| | | | |
|---|---|---|---|
| 3,890,469 | 6/1975 | Kelly et al. | 370/59 |
| 4,467,469 | 8/1984 | Krikor | 370/58 |
| 4,491,838 | 1/1985 | West | 370/58 |
| 4,504,942 | 3/1985 | Aro et al. | 370/58 |

OTHER PUBLICATIONS

Fink et al., "Electronics Engineer's Handbook 2nd Ed.", McGraw-Hill, 1982, pp. 22-63–22-65.

*Primary Examiner*—Douglas W. Olms
*Assistant Examiner*—Wellington Chin
*Attorney, Agent, or Firm*—Staas & Halsey

[57] ABSTRACT

A system for linking channel groups from various data terminals in a sending station to corresponding data terminals in a receiving station, via digital telephone switching networks. Orderly connection of channels, maintaining the space order and time phase between channels of the group, is accomplished by providing a group trunk (as named by the inventors) in each terminal station, to connect the data terminals to the telephone network. The group trunk establishes the necessary number of channels between the sending and receiving stations. The group trunk of the sending station provides data to be transmitted with a channel identification code, with which the data is transmitted. The group trunk of the receiving terminal detects the channel identification code of the received data, then rearranges the channel paths of the receiving terminal, and equalizes the delay time of each channel.

9 Claims, 10 Drawing Figures

SYSTEM FOR LINKING CHANNEL GROUP IN DIGITAL COMMUNICATION NETWORK

BACKGROUND OF THE INVENTION

The present invention relates to a digital communication network, more particularly, to a system for linking a group of channels (a channel group) between two terminals. The channels in the channel group are connected in the same order at each terminal, even though the digital telephone switching network connecting the terminals is not required to keep the channels in order.

Recently, the demand for non-telephone data transmission such as high speed data communication, facsimile or image transmission, is increasing. These services require a broader band data link than that of a telephone channel. Meanwhile, the movement to digitize existing telephone networks is progressing. As a result, data transmission networks and digital telephone networks are constructed differently from each other. The present invention intends to provide a data transmission system which can utilize a digital telephone network as a data transmission network and improve the utilization of digital telephone systems by data communication equipment.

A telephone switching system, whether it is an analog system or digital system, is based on the principle that the channel which links two terminals is established by selecting one channel out of a group of idle trunks, and switching (connecting) them to a terminal (telephone) for each call. Therefore, the channel path, selected by switching equipment located between two terminals and used to link them, is different from call to call.

In prior art technology, in order to link a channel a group between two terminals (group connection) keeping a specific relationship between each channel (space order), a specific control signal was used for the switching systems to bundle the channels in the specific order. Such specially controlled channel switching networks can not be used for general purpose communications, because they are idle at all times except during the special use. Therefore, such special connection of channel groups is not desirable, from the view point of channel utilization.

SUMMARY OF THE INVENTION

An object of the present invention, therefore, is to provide a system for orderly connection of channel groups between sending terminals and receiving terminals connected via a digital communication network, without special connection of the channels or the use of a special control signal.

Another object of the present invention is to improve the utilization of digital communication networks.

The foregoing objects are accomplished by adding a group trunk (as defined by the inventors) in each user terminal connected to a channel group. The group trunk establishes a group of channels between the sending and receiving terminals in a way similar to the ordinary method of telephone call processing, and then it rearranges undesirable relations (disorder) between the channels in the group as they arrive at the receiving terminal. Thus, the group trunk accomplishes the orderly connection of channel groups, keeping the relationship of space and time between the channels as specified by the sending terminal.

The group trunk is provided with a computer (central processor unit CPU) and has the following functions:

1. Originating calls in each of the channels grouped at the sending terminal.
2. Sending a call signal assigned to the receiving trunk via each channel of the group.
3. Receiving the call signal at the receiving trunk and sending back an answer signal toward the sending trunk, to establish the data channels.
4. Providing data with a channel identification code corresponding to each of the data channel through which the data are sent.
5. Detecting the channel identification code of the received signals and rearranging the space order of the channels within the group.
6. Equalizing the time delay in each of the established data channels.

Using such a group trunk, it is possible to link the channel group of a sending terminal to a receiving terminal, keeping the space order and time phase between each channel of the group, simply by dialing the telephone code of a receiving trunk and specifying a channel identification code for each data channel. The system utilizes existing digital communication networks without harming the ordinary operation of the networks.

DESCRIPTION OF PREFERRED EMBODIMENTS

Details of the present invention will be disclosed with regard to some preferred embodiments referring to the attached drawings. In the figures, similar notation or reference numerals are used for similar or corresponding parts.

Figure 1:
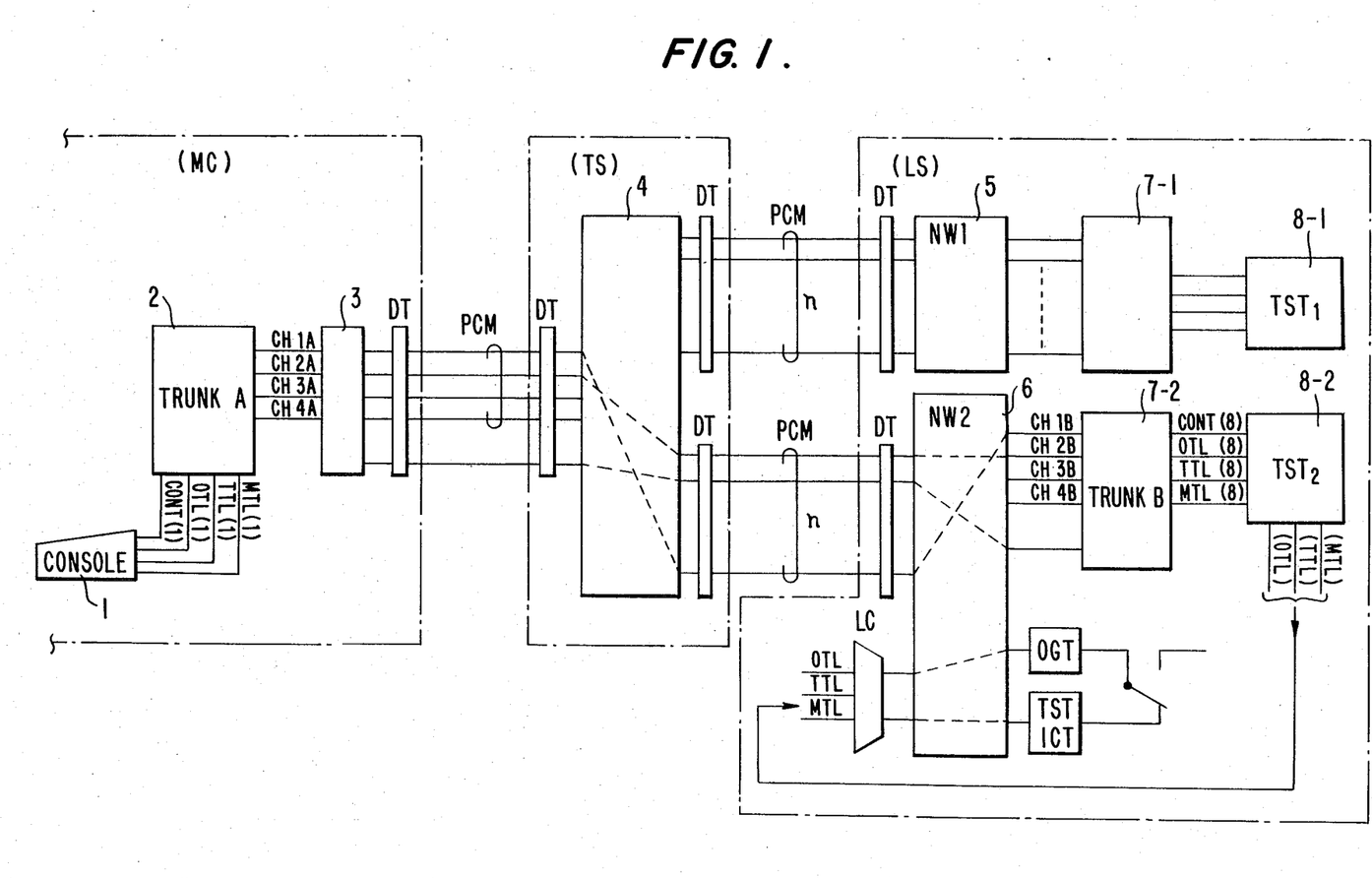
FIG. 1 is a block diagram of a centralized maintenance system for a telephone company, illustrating an embodiment of a system for linking channel groups according to the present invention.

FIG. 1 is a block diagram of a centralized maintenance and operation center for a telephone company, which uses a channel group linking system. In FIG. 1, 1 is a supervisory console installed in a central maintenance office. Reference numeral 2 designates a group trunk (as defined by the inventors) according to the present invention, and 3 is an interface circuit, both of which are installed in a maintenance center MC. Reference numeral 4 is a toll switch network which is installed in a toll switch office TS. Reference numerals 5 and 6 are local switch networks installed in a local switch office LS. The switch networks 4, 5 and 6 compose a communication network. 7-1 and 7-2 designate group trunks installed in the local switch office LS, and 8-1 and 8-2 are adapters for testing.

In the present embodiment, a channel group composed of four channels, for example, is linked between a supervisory console 1 in maintenance center MC and a test adapter 8-2 in a local switch office LS, via an ordinary digital telephone network. Namely, four test channels CONT(1), OTL(1), TTL(1) and MTL(1) from console 1 in the maintenance center MC are respectively connected to test channels CONT(8), OTL(8), TTL(8) and MTL(8) of test adapter 8-2 in the local switch office LS. The group trunks 2, 7-1 and 7-2 in the maintenance center MC and the local switch office LS are all the same type of unit. The function of the group service trunk will be described with respect to FIG. 2.

Figure 2:
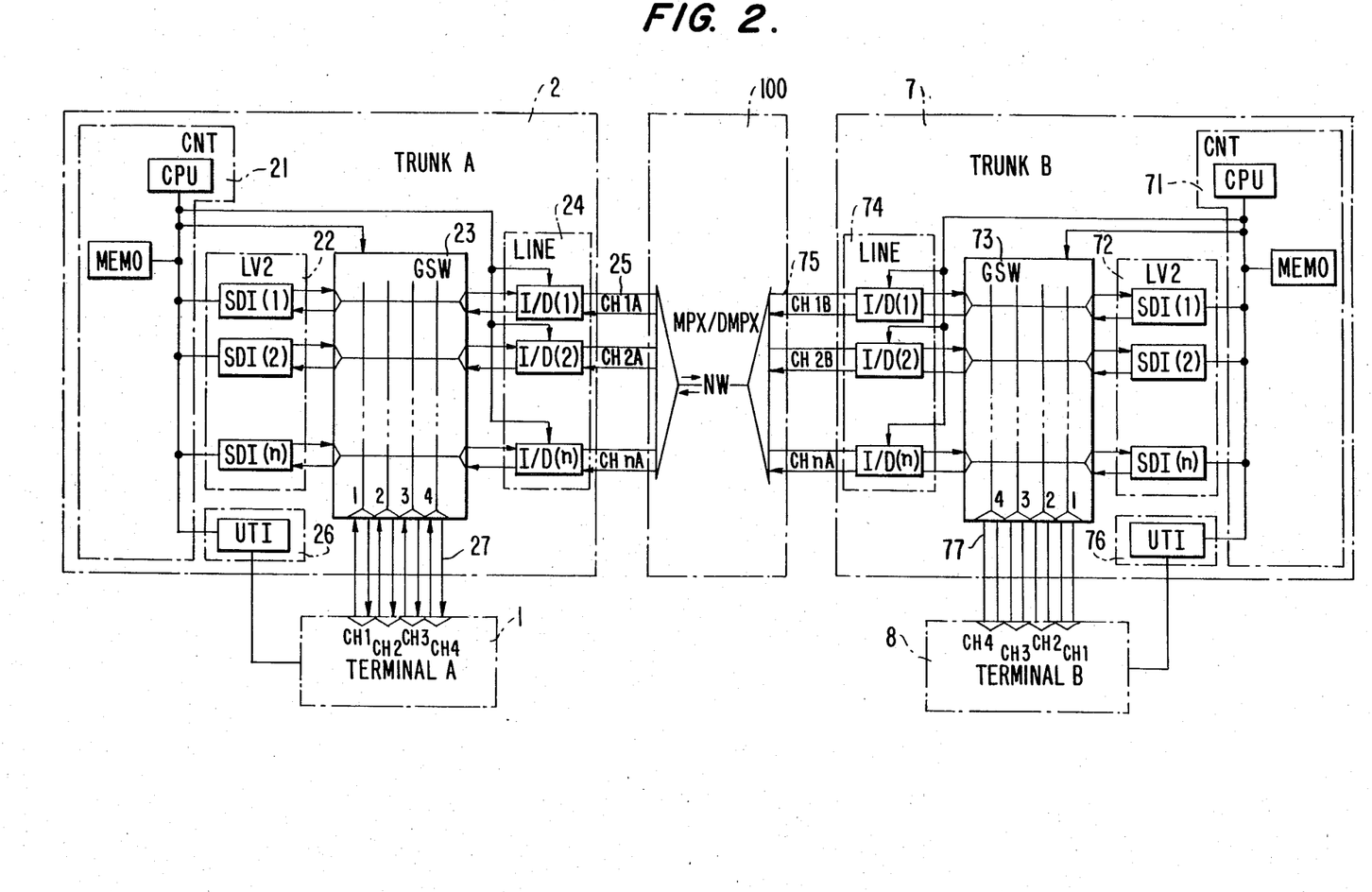
FIG. 2 is the diagram to illustrate a composition and operation of a group trunk according to the present invention.

FIG. 2 illustrates the components and operation of a group trunk according to the present invention. In Trunk A of the maintence center in FIG. 2, 21 is a stored program type controller unit CNT, which includes a central processing unit CPU and a memory device MEMO. Reference numeral 22 is a serial data interface (SDI) for data link control, 23 is a cross connected gate switch (GSW) for data paths and 24 is an inserter and dropper (I/D) for line signals, all of which can be integrated circuits (ICs) and therefore very compact and cheap. Reference numeral 25 designates channel paths connecting the group trunk 2 and the digital communication network 100 includes the digital switch networks of TS and LS (4, 5 and 6 in FIG. 1) and all the transmission digital links connecting the switch networks. Reference numeral 26 is a user terminal interface (UTI), and 27 are vertical channel paths (in this case there are four channels) between user terminal 1 (in this case it is a supervisory console) and group trunk 2. A similar group service trunk 7 is used for the local switch office LS (FIG. 1). In FIG. 2, the reference numerals in the seventies designate the components of the group trunk in the Trunk B of the local office LS of FIG. 1 corresponding to the components of Trunk A.

The line signal inserter/dropper (I/Ds) 24 is a line signal circuit to transmit or receive the line signal for one of the channels, under control of the central processing unit CPU.

The serial data interface (SDI) 22 is a processor which converts the parallel data from the CPU to serial data for a PCM (pulse code modulation) channel or vice versa, the SDI is also used to provide each of the data with a channel identification signal corresponding to each of the channels in the group of channels connected to the user terminal 1 generating data, under the control of the CPU or to distinguish the channel identification signals in the PCM data channel.

The gate switches (GSW) 23 comprises a switching circuit which connects the channels established in the group trunk 2 or 7 to the user terminal 1 or 8 (console or test adapter). It includes an interface for a data path from the CPU, because it is controlled by the CPU via this data path.

The memory device MEMO is used to store a control program and the necessary data for switching. The user terminal interface (UTI) 26 is an interface circuit to transmit or receive the signal between the user terminal 1 or 8 (console or test adapter) and the group trunk 2 or 7. Calls from the console are transmitted through the interface 26 to the controller (CNT) 21 of the group trunk 2.

All of these individual circuits are similar to those used for prior art transmission networks or easily obtained by modification from prior art circuits, and they are well known to one skilled in the art.

Now an operation of group connection will be described referring to FIGS. 1 and 2. The operation of the system is started by generation of an off-hook signal by the telephone on the console 1. As mentioned before, the disclosure will be explained with a system having a group of four channels hereinafter. But the invention is not limited to four channels, and any number of channels may be grouped.

The off-hook signal is detected by the central processing unit CPU and four call signals are originated separately in the four I/Ds 24. The call signals are sent out via the channel paths 25, which are used as line signals for connections to the communication network 100. The connections are processed by the CPU according to the stored program and information from the user terminal 1. All control data and the control program for the CPU are stored in the memory device MEMO beforehand. Each line signal is multiplexed by using a PCM (pulse code modulation) scheme and sent to the toll switch TS. This process is similar to ordinary PCM multiplex systems.

Next, the phone number of the group trunk 7-2 in local switch station LS, whose equipment is to be tested, is dialed from the user terminal 1. This dial signal is also sent out on each of the same four channels and sent to the toll switch TS, in a manner similar to the call signal.

Reference letters A and B hereinafter designated the corresponding parts located at the sending terminal and receiving terminal, respectively. For example, terminal A refers to terminal equipment of the maintenance center MC and trunk B refers to a trunk in the receiving terminal in the local switch office LS.

In the communication network 100, each of the four channels establishes a path to the switch network 6 (NW2) of the terminal local office LS by finding an idle path and an idle trunk between the maintenance center MC and the terminal local office LS, in a manner similar to that in ordinary telephone switching. Therefore, the call signals originated from each of four channels ch-1A, ch-2A, ch-3A and ch-4A of group trunk A, are each transmitted to one of n channels of the receiving trunk B.

Answer signals which are generated by a signal generator (not shown) are sent back from each channel I/D 74 of the receiving trunk B (7-2) to a corresponding I/D 24 of the sending trunk A. This is similar to an ordinary telephone line. Thus, four communication paths are established, between two group trunks A and B. But the four sending channels ch-1A, ch-2A, ch-3A and ch-4A are not always connected to ch-1B, ch-2B, ch-3B and ch-4B of the receiving trunk B, respectively.

In order to determine a destination where the signal should be received, on every signal (including the call signal) or data sent out from each channel of group trunk A, there is added an identification code which indicates the terminal or destination to which the data should be sent (channel address). These data identification codes are added by the SDI-A under the control of CPU-A. On the other hand, each of four channel paths (PCM serial data paths) established in the group trunk B is connected to the CPU-B via each serial data interface SDI-B. The SDI-B detects the identification code (channel address) of the received data and sends it to CPU-B. According to this information the CPU-B controls the gate switch 73, and switches the path from each input channel path 75 to each destination channel in output path 77.

In this a manner, each of the four channels CONT(1), OTL(1), TTL(1) and MTL(1) of terminal A is connected respectively to each of the four channels CONT(8), OTL(8), TTL(8) and MTL(8) of terminal B, and the orderly connection of the channel group is established. Using these four channels, remote testing of the local office can be performed. But since the remote testing is not directly related to the present invention, it will not be described further.

The above disclosure provided using an example of group connection for a remote maintenance center of a telephone company. Of course the invention is not limited to such an application, and the number of channels which can be group connected is not limited to four.

Figure 3:
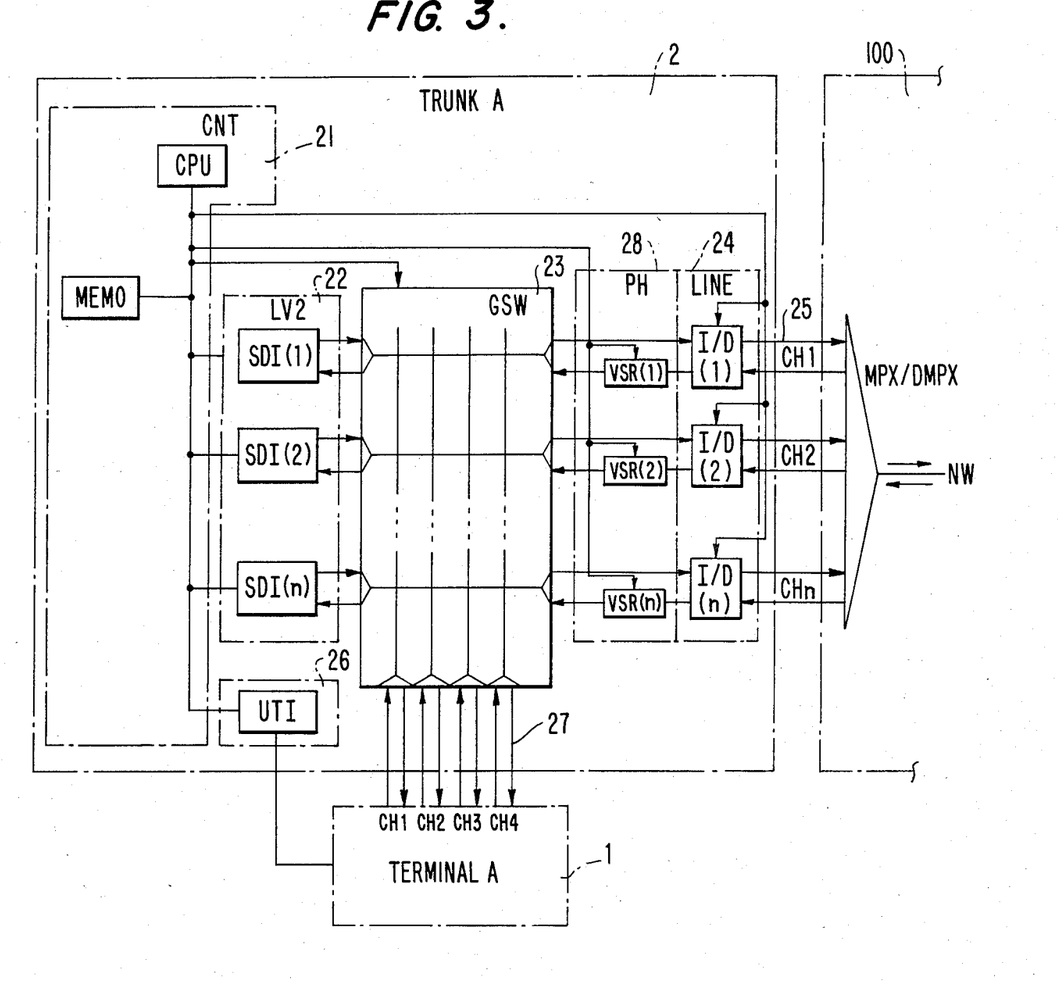
FIG. 3 is a block diagram for another embodiment of groups trunk which links a channel group according to the present invention.

FIG. 3 illustrates a block diagram for another type of group trunk applicable to a group connection according to the present invention. FIG. 3 illustrates a block diagram of group trunk A, that is, a group trunk used for a sending terminal. But, as mentioned before, the same group trunk may be used for a receiving terminal, as, for example, a trunk B. In this embodiment, the number of channels which are group connected is n. Namely, ch-1A, ch-2A, . . . , ch-nA are linked as a group to any other station which is provided with a group trunk.

The group trunk of FIG. 3 is applicable for a channel group which requires not only orderly connection, but also orderly arrival. That is, it keeps the time of arrival at the destination in a definite order, thereby maintaining the phase relationship between each channel in the group. Such a requirement often occurs in multiplex digital data transmission.

In a general digital telephone system, the network is synchronized in order to switch time divided multiplex signals. The digital telephone network is synchronized with a frequency synchronization and a frame synchronization, but phase synchronization between data channels are not performed, because it are not required for ordinary telephone communications.

Therefore, when one frame of data is sent via four channels (in the system of FIG. 1, for example), there occurs a time delay of one or two frames before the data is in one frame is all received. Once the path between the group trunks A and B is established, the time delay is constant for each channel. Therefore, if the differences between the time delays for each channel are corrected, it is possible to establish a broad band data link, utilizing a plurality of telephone channels.

The group trunk A illustrated in FIG. 3 is an example which is provided with phase correction. In this embodiment, the group trunk A is provided with a variable shift register VSR for each channel path. The process of time delay correction is as follows.

(1) After the channel establishment of n channels is completed, the CPU-A sends a test signal in each channel with the same phase.
(2) The test signal received by I/D-B is sent to CPU-B.
(3) The CPU-B measures the time delay between each signal and sends the measured delay times to the memory MEMO which stores them.
(4) In the memory MEMO, a program to control the VSR according to the measured delay time times is stored beforehand.
(5) CPU-B controls the VSR of each channel according to the program and delay time data stored in the memory MEMO. Using such a process, the equalization of delay time between each data channel is accomplished. Thus, a broad band data link between the trunk-A and trunk-B is established, using n channels of a telephone system.

FIG. 4 illustrates the phase relationship of data signals in a group connection system like that described above. In FIG. 4(e), a schematic outline of a group connection system is illustrated. The time relationship between data elements at several points in FIG. 4(e) are illustrated in FIGS. 4(a) to 4(d). An example of sending out four byte signals using a group connection of four channels is illustrated. Each byte is an eight bit signal.

Figure 4A:
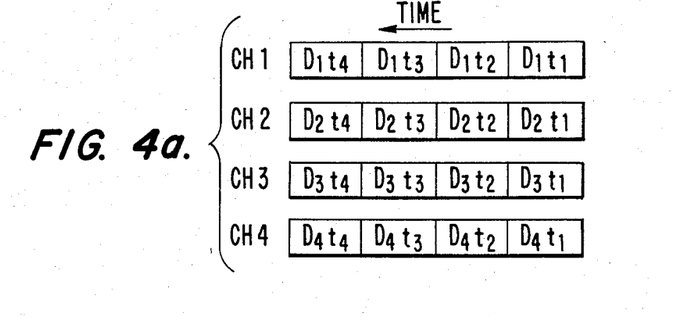
FIG. 4(a) illustrates a time relationship between data elements sent out to each of four channels in group trunk A.

FIG. 4(a) illustrates a time relationship between data elements sent out of each of four channels in group trunk A. From the channel ch-1, data elements $D_1t_1$, $D_1t_2$, $D_1t_3$ and $D_1t_4$ are sent out at the times $t_1$, $t_2$, $t_3$ and $t_4$, respectively. From the channel ch-2, data elements $D_2t_1$, $D_2t_2$, $D_2t_3$ and $D_2t_4$ are sent out at the same times $t_1$, $t_2$, $t_3$ and $t_4$, respectively. Similarly, from channel ch-3 and ch-4, data elements $D_3t_1$ . . . are sent out, as illustrated in FIG. 4(a).

Figure 4B:
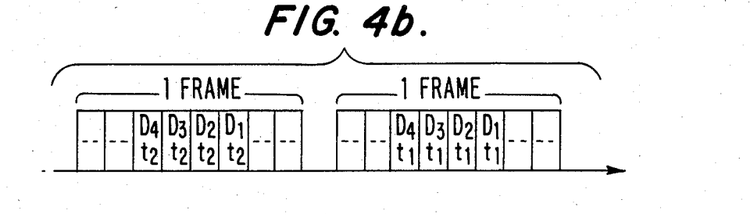
FIG. 4(b) illustrates the data elements in FIG. 4(a) after being time divided, multiplexed and combined into frames in time/space.
Figure 4C:
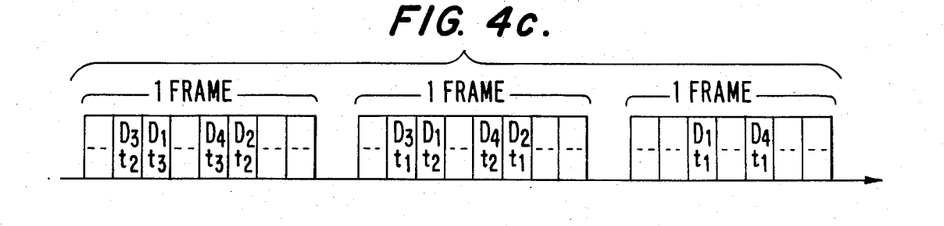
FIG. 4(c) illustrates disordered data elements in transmission.

These data elements are time divided, multiplexed and combined into frames in time/space, as illustrated in FIG. 4(b), by multiplexer MPX, and transmitted into the switching network 100. In the switching network 100, a byte of data is regarded as a unit data element, and data are switched byte by byte, utilizing idle channels. Therefore, the delay time of received data can be different for each channel. When the data arrives at the demultiplexer DMPX of the destination station, therefore, the order of the data elements in a frame can vary, and it is not always certain that data elements in a transmitted frame will be included in the same received frame. An example of such a situation is illustrated in FIG. 4(c). Data elements are disordered as illustrated $D_2$, $D_4$, $D_1$ and $D_3$, and moreover, the data elements $D_2$ and $D_3$ for $t_1$ are not included in the first frame, because of time delay.

Figure 4D:
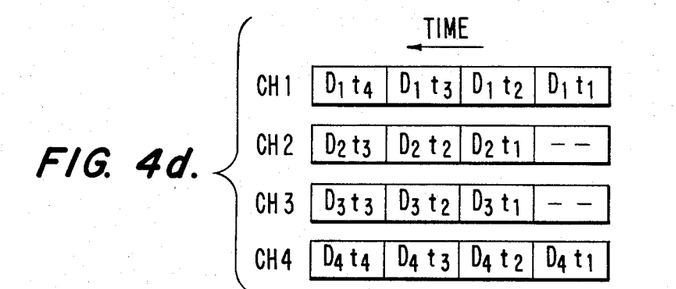
FIG. 4(d) illustrates the multiplexed disordered data elements.
Figure 4E:
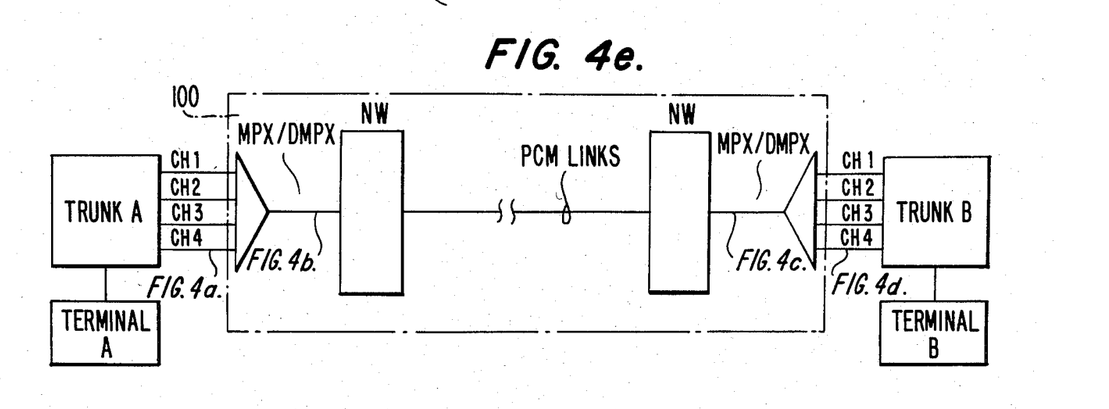
FIG. 4(e) is a schematic outline of a group connection system indicating at what point each of FIGS. 4(a)–4(d) occur during transmission from Terminal A to Terminal B.

The phase equalizer 28 in FIG. 3 is provided to rearrange the disordered phase of the data elements. The phase equalizer 28 is composed of variable shift registers VSR provided for each channel. The process for reordering the data elements is similar to that described with regard to FIG. 2. Namely, when the serial data are demultiplexed by MPX/DMPX-B and distributed to each channel, the signal in each channel is as illustrated in FIG. 4(d). The arrival time of each data of time $t_1$ is detected by SDI-B and CPU-B. This time delay (it is a multiple of the frame period) is stored in MEMO-B, and CPU-B controls the VSRs-B to equalize the delay time of each channel, according to a program stored in MEMO-B beforehand.

Figure 5:
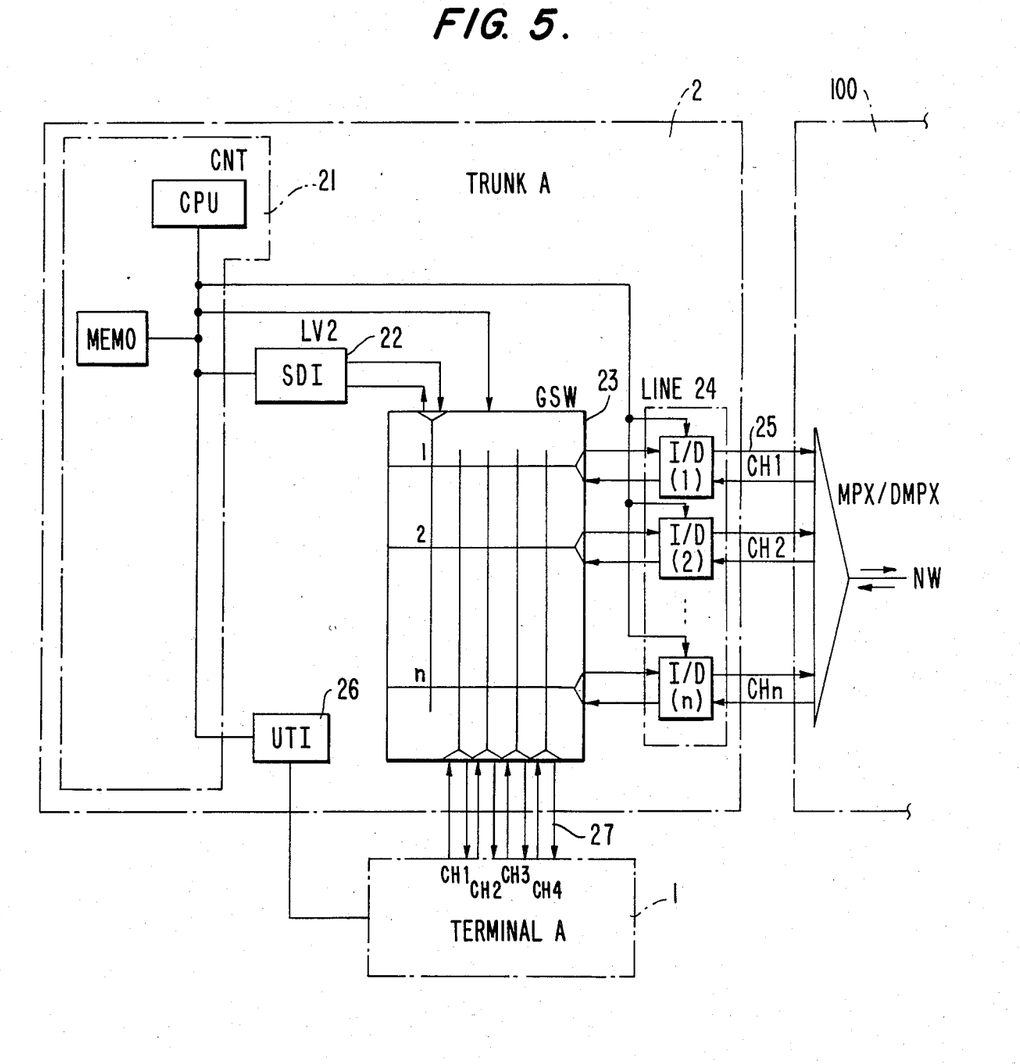
FIG. 5 is a diagram for still another embodiment of a group trunk according to the present invention, which simplifies the circuits of FIG. 2 or 3.

FIG. 5 illustrates another embodiment of a group trunk. This is a simplified trunk corresponding to that of FIG. 2. Comparing FIG. 5 to FIG. 2, only one serial data interface (SDI) 22 is linked to the gate switching network (GSW) 23. In this example four vertical channel paths CH1 to CH4 of terminal A are orderly group connected, through n horizontal channel paths ch-1 to ch-n of group trunk A, to four channels of terminal B included in group trunk B (not shown). The operation of group connection is as follows:

(1) Similarly to FIG. 2, by call generation and dialing from terminal A to terminal B, four channels are established between the two terminals.
(2) Among these four channels, the first established path is selected as a control channel. Assume it is established between ch-1A and ch-3B (not shown).
(3) CPU-A sends an identification signal code of CH-1 through channel ch-1A. Assume this identification signal code is received by I/D(3)-B. Then the CPU-B is informed that ch-3B should be connected to CH-1B, and this information is stored in MEMO-B.
(4) Next, CPU-A sends an identification signal code of CH-2A through ch-2A. Assume this identification signal code is received by I/D(8)-B. Then the CPU-B is informed that ch-8B should be connected to CH-2B and this information is stored in MEMO-B.
(5) In a similar manner, all four channels are identified to each other. All of the control data for GSW-B is stored in MEMO-B.
(6) According to the control data and a program stored in MEMO-B beforehand, CPU-B controls the GSW-B so that four channels are orderly connected to each other. It should be pointed out that such simplification is also applicable to the group trunk illustrated in FIG. 3. It will not be described herein, since the application is easy for one skilled in the art.

Figure 6:
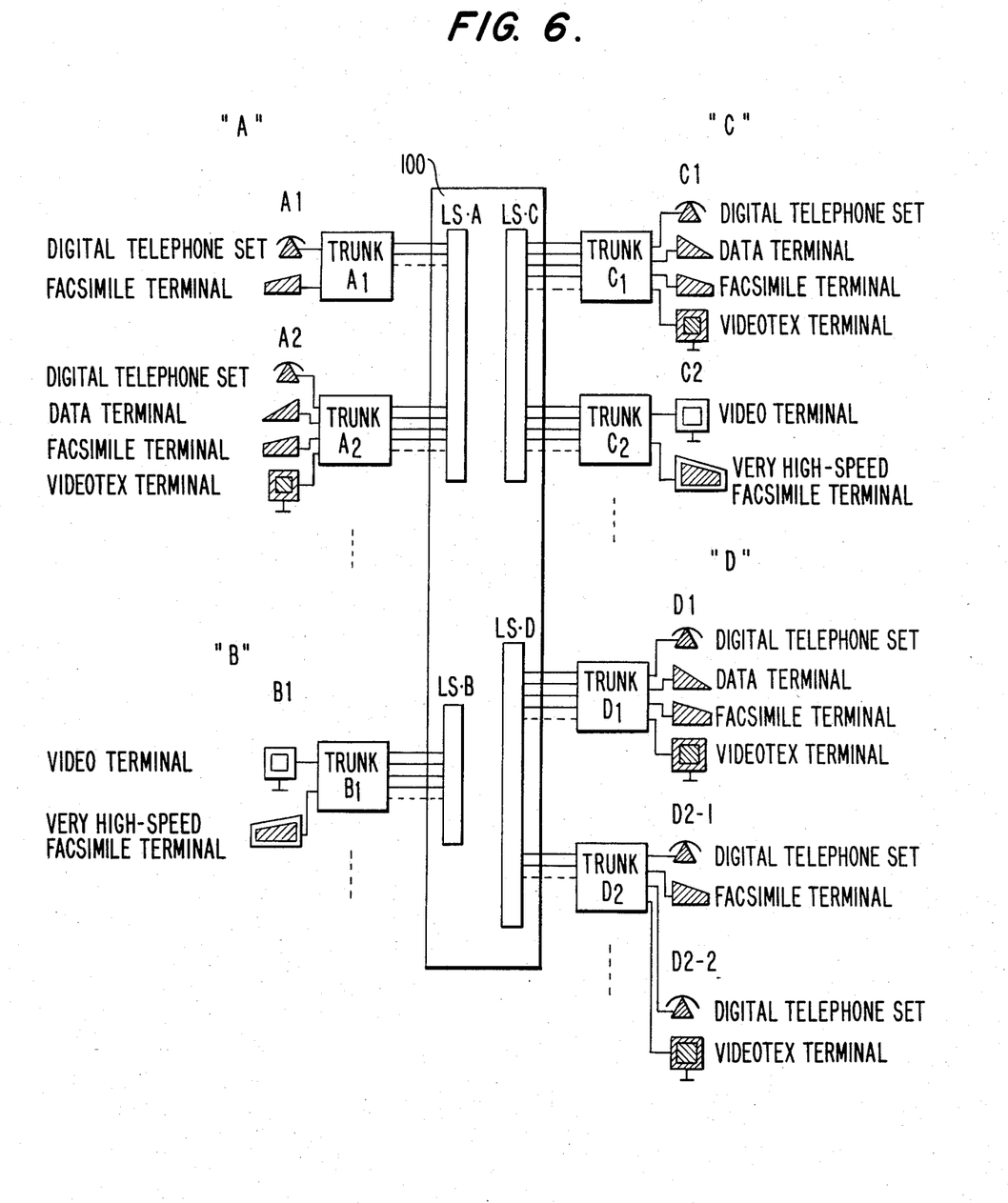
FIG. 6 is a schematic diagram illustrating a comprehensive data transmission network, utilizing a system for group connection according to the present invention.

FIG. 6 illustrates an example of a comprehensive data transmission network which enables the use of telephone and other data terminals in the same network, applying channel group connection systems according to the present invention. FIG. 6 includes examples of group connections between areas. An area is a group of subscribers which are linked to the same local station LS. A subscriber can use any type of terminal equipment. For example, a subscriber A1 uses a telephone and a facsimile unit, a subscriber A2 uses a telephone, a data terminal a facsimile unit and a video-tex terminal. Subscribers A1, A2 and so on are located in area A, and they are linked to local station LS-A. Similarly, a subscriber C2 of area C, linked to local station LS-C, has a video terminal and a very high speed facsimile terminal. Any other subscribers, as illustrated in FIG. 6, can use any type of terminal equipment, the only limit is that they are digitized and they are linked to a local station via a group trunk. The number of channels to be linked to the local station depends on the frequency band of the information which is handled by the terminal equipment to be used.

Any subscriber can call another subscriber to send information, simply by dialing from his user terminal the telephone number of a subscriber who has the same terminal equipment. When he dials the telephone number and specifies the equipment to be used, the group trunk finds the terminal equipment and orderly links a necessary number of specified channels between them.

Referring to FIG. 6, for example, a user of the group terminal A2 has a digital telephone set, data terminal, facsimile unit and videotex, and he can link his equipment to any of the same type of equipment of the other subscribers. When he wants to link his telephone and facsimile, for example, to that of subscriber D1, he dials from his terminal A2 the telephone number of subscriber D1, and he specifies the equipment to be used are telephone and facsimile. The UTI of Trunk A2 sends the information about the equipment and channels to be used to the CPU, and the data are stored in the memory MEMO. Then, in a manner similar to that described before, the group trunks of both terminals (group trunk A2 and D1) orderly connect the telephone to telephone, and facsimile to facsimile, and, of course, time delays are equalized.

It should be pointed out, that if the user terminal equipment does not include dial equipment (for example, subscribers B1 and C2), an ordinary dialing equipment (not shown) is attached to the terminal equipment. It is also possible, like the subscribers D2-1 and D2-2 illustrated in FIG. 6, for a plurality of subscribers to commonly use a group trunk.

As has been disclosed above, the present invention enables a digital telephone network to be used as a data transmission network. In the above disclosure the equipment and circuit elements such as central processing unit CPU, memory device MEMO, serial data interface SDI, gate switch GSW, line signal inserter/dropper I/D, variable shift register VSR and user terminal interface UTI etc. are all well known and used in prior art communication systems. Therefore, they will be well understood by ones skilled in the art.

We claim:

1. A system for orderly connection of channel groups between various types of terminal equipment, used as sending terminals and receiving terminals, via a digital communication network, including a digital data transmission network having telephone channels and a digital telephone switching network, said system comprising:

a sending terminal of a selected type of terminal equipment, operatively connected to the digital communication network, for generating data to be transmitted over a selected channel group at one time, the selected channel group including a plurality of the telephone channels;

a receiving terminal of the selected type of terminal equipment, operatively connected to the digital communication network, for receiving the data over the selected channel group; and group trunks, operatively connected to the digital communication network, each of said sending and receiving terminals corresponding to and operatively connected to one of said group trunks, each of said group trunks comprising:

call signal means, operatively connected to the digital communication network and the corresponding one of said sending and receiving terminals, for originating and terminating a call signal assigned to said receiving terminal by establishing the selected channel group to include a sufficient number of the telephone channels to transmit the data between terminals of the selected type;

channel identification means, operatively connected to said call signal means, for adding a channel identification signal to the data transmitted by said sending terminal, the channel identification signal identifying which of the telephone channels are included in the selected channel group; and controller means, operatively connected to said call signal means and said channel identification means, for distinguishing the channel identification signals, assigned to the data transmitted over the selected channel group, when the data is received by said group trunk corresponding to said receiving terminal, and controlling space and time order of the data transmitted over the selected channel group to said receiving terminal.

2. A system according to claim 1,
wherein said controller means comprises:
   a central processing unit, operatively connected to said channel identification means and said call signal means, for controlling the space and time order of the data transmitted over the selected channel group to said receiving terminal; and
   a memory device, operatively connected to said central processing unit, for storing a program and control data for use by said central processing unit,
wherein said channel identification means comprises a plurality of serial data interfaces operatively connected to said central processing unit, for providing the channel identification signal for the data generated by said sending terminal and identifying the channel identification signal received by the receiving terminal,
wherein said call signal means comprises a plurality of line signal inserter and droppers operatively connected to said controller, and
wherein each of said group trunks further comprises:
   a plurality of vertical channel paths operatively connected to the corresponding one of said sending and receiving terminals;
   means, operatively connected to said central processing unit, said line signal inserter and droppers and the corresponding one of said sending and receiving terminals, for transmitting the data generated by said sending terminal of said central processing unit;
   a plurality of horizontal channel paths, each operatively connected to the digital communication network and one of said line signal inserter and droppers; and
   a gate switch network, operatively connected to said central processing unit, said line signal inserter and droppers, said vertical channel paths and said serial data interfaces, and comprising a plurality of gate switches, each of said vertical channel paths being connectable by said gate switches to each of said line signal insert and droppers under control of said central processing unit.

3. A system according to claim 2,
wherein said group trunk corresponding to said sending terminal selects from among said horizontal channel paths a necessary number of said horizontal channel paths equal in number to said plurality of vertical channel paths operatively connected to said sending terminal, and sends the call signal assigned to said receiving terminal over each of the selected horizontal channel paths through said line signal inserter and droppers under control of said central processing unit, and
wherein said group trunk corresponding to said receiving terminal, receives the call signal and sends back answer signals to said sending terminal through said line signal and droppers under control of said central processing unit, and establishes the necessary number of said horizontal channel paths between said sending and receiving terminals.

4. A system according to claim 2, wherein said group trunk corresponding to said receiving terminal detects the channel identification signal from the data received via said horizontal channel paths in said serial data interfaces, and said central processing unit controls the gate switches, in dependence upon the program stored in said memory device and the channel identification signal, to operatively connect said horizontal channel paths to said vertical channel paths.

5. A system according to claim 2, 3 or 4, said group trunk further comprising a plurality of variable shift registers, operatively connected to said gate switch network and said line signal inserters and droppers, for varying a delay time of the data received over said horizontal channel paths, under the control of said central processing unit, and equalizing the delay time for the data received.

6. A system according to claim 2, 3 or 4, wherein said group trunk comprises only one of said serial data interfaces.

7. A system according to claim 5, wherein said group trunk comprises only one of said serial data interfaces.

8. A system according to claim 1, wherein the data generated by said sending terminal and received by said receiving terminal is generated by different types of terminal equipment.

9. A system according to claim 8, wherein the different types of terminal equipment output at least one of computer data, facsimile transmission data, television transmission data and digitized telephone conversation data.

* * * * *